(12) United States Patent
Holley et al.

(10) Patent No.: US 9,407,083 B1
(45) Date of Patent: Aug. 2, 2016

(54) COMBINED SUBTRANSIENT CURRENT SUPPRESSION AND OVERVOLTAGE TRANSIENT PROTECTION

(71) Applicant: The Boeing Company, Chicago, IL (US)

(72) Inventors: Robert D. Holley, Seattle, WA (US); Thomas F. Currier, Lynnwood, WA (US); Eugene V. Solodovnik, Lake Stevens, WA (US); Farhad Nozari, Woodinville, WA (US)

(73) Assignee: THE BOEING COMPANY, Chicago, IL (US)

( * ) Notice: Subject to any disclaimer, the term of this patent is extended or adjusted under 35 U.S.C. 154(b) by 193 days.

(21) Appl. No.: 14/058,752

(22) Filed: Oct. 21, 2013

Related U.S. Application Data

(63) Continuation-in-part of application No. 13/457,061, filed on Apr. 26, 2012.

(51) Int. Cl.
| | |
|---|---|
| *H02H 7/06* | (2006.01) |
| *H02H 3/08* | (2006.01) |
| *H02H 3/02* | (2006.01) |
| *H02H 3/00* | (2006.01) |
| *H02H 7/00* | (2006.01) |

(52) U.S. Cl.
CPC ............ *H02H 3/025* (2013.01); *H02H 3/00* (2013.01); *H02H 7/00* (2013.01)

(58) Field of Classification Search
CPC ........... H02H 3/025; H02H 3/00; H02H 7/00; H01F 38/14; B60R 16/03
USPC ......................................... 318/430, 434, 435
See application file for complete search history.

(56) References Cited

U.S. PATENT DOCUMENTS

| | | | |
|---|---|---|---|
| 3,634,729 A | 1/1972 | Hendry et al. | |
| 3,855,434 A * | 12/1974 | Grunert et al. | ................ 218/118 |
| 4,241,372 A | 12/1980 | Sears | |
| 4,812,729 A * | 3/1989 | Ito et al. | ........................ 318/732 |
| 4,973,902 A | 11/1990 | Dhyanchand et al. | |

(Continued)

FOREIGN PATENT DOCUMENTS

| | | |
|---|---|---|
| DE | 2710625 A1 | 9/1978 |
| EP | 1058365 A2 | 12/2000 |
| WO | WO2011116832 A1 | 9/2011 |

OTHER PUBLICATIONS

Holley et al., "Subtransient Current Suppression," U.S. Appl. No. 13/457,061, filed Apr. 26, 2012, 34 pages.

(Continued)

*Primary Examiner* — Bentsu Ro
*Assistant Examiner* — Zemenay Truneh
(74) *Attorney, Agent, or Firm* — Yee & Associates, P.C.

(57) ABSTRACT

A system and method for suppressing a subtransient current and an overvoltage in a power system. A subtransient current is identified at a location in the power system. The subtransient current at the location in the power system is directed to ground for a time delay in response to identifying the subtransient current at the location in the power system. Directing the subtransient current at the location in the power system to ground is ceased in response to identifying an end of the time delay. An overvoltage is identified at the location in the power system. The overvoltage at the location in the power system is suppressed in response to identifying the overvoltage at the location in the power system.

18 Claims, 7 Drawing Sheets

(56) References Cited

U.S. PATENT DOCUMENTS

| | | | |
|---|---|---|---|
| 5,805,394 A | 9/1998 | Glennon | |
| 5,850,138 A * | 12/1998 | Adams et al. | 322/68 |
| 6,625,550 B1 | 9/2003 | Scott et al. | |
| 7,253,640 B2 | 8/2007 | Engel et al. | |
| 7,489,138 B2 | 2/2009 | Yu et al. | |
| 7,564,662 B2 | 7/2009 | Zhang et al. | |
| 7,646,572 B2 | 1/2010 | Mills et al. | |
| 7,817,396 B2 * | 10/2010 | Tao et al. | 361/112 |
| 2001/0010684 A1 * | 8/2001 | Willenegger et al. | 370/311 |
| 2002/0149891 A1 | 10/2002 | Neiger et al. | |
| 2003/0169544 A1 * | 9/2003 | Langford et al. | 361/42 |
| 2005/0036250 A1 * | 2/2005 | Asano | 361/42 |
| 2006/0044710 A1 * | 3/2006 | Beneditz et al. | 361/20 |
| 2006/0072270 A1 * | 4/2006 | Mladenik | H02H 3/00 361/93.1 |
| 2008/0201020 A1 | 8/2008 | Scholtz et al. | |
| 2010/0031942 A1 | 2/2010 | Lepley et al. | |
| 2010/0259859 A1 | 10/2010 | Prabhu et al. | |
| 2010/0284114 A1 * | 11/2010 | Kilroy | H02H 3/202 361/86 |
| 2010/0284117 A1 * | 11/2010 | Crane | B63H 21/20 361/93.1 |
| 2010/0328828 A1 | 12/2010 | Xu | |
| 2011/0031942 A1 | 2/2011 | Green | |
| 2011/0037323 A1 | 2/2011 | Buerer | |
| 2011/0216452 A1 * | 9/2011 | Haines | H02H 3/00 361/42 |
| 2013/0147412 A1 * | 6/2013 | Solodovnik et al. | 318/454 |
| 2013/0271877 A1 * | 10/2013 | Novakovic et al. | 361/20 |
| 2013/0286513 A1 | 10/2013 | Holley et al. | |
| 2013/0286515 A1 | 10/2013 | White et al. | |

OTHER PUBLICATIONS

Office Action, dated Feb. 27, 2014, regarding U.S. Appl. No. 13/457,061, 14 pages.

Office Action, dated Apr. 11, 2014, regarding U.S. Appl. No. 13/455,954, 18 pages.

Notice of allowance, dated Jun. 4, 2014, regarding U.S. Appl. No. 13/455,954, 7 pages.

Final Office Action, dated Jul. 24, 2014, regarding U.S. Appl. No. 13/457,061, 22 pages.

Office Action, dated Nov. 24, 2014, regarding U.S. Appl. No. 13/457,061, 13 pages.

Canadian Intellectual Property Office Examination Search Report, dated Jun. 22, 2015, regarding Application No. 2,803,400, 3 pages.

Extended European Search Report, dated Mar. 31, 2015, regarding Application No. EP13163183.0, 6 pages.

Final Office Action, dated Apr. 20, 2015, regarding U.S. Appl. No. 13/457,061, 17 pages.

* cited by examiner

COMBINED SUBTRANSIENT CURRENT SUPPRESSION AND OVERVOLTAGE TRANSIENT PROTECTION

This application is a continuation-in-part of U.S. patent application Ser. No. 13/457,061 filed Apr. 26, 2012, which is incorporated herein by reference in its entirety.

BACKGROUND INFORMATION

1. Field

The present disclosure relates generally to electrical power systems, such as systems for generating and distributing electrical power on an aircraft. The present disclosure relates more specifically to identifying undesired conditions, such as subtransient current conditions and overvoltage transients, in electrical power systems and protecting electrical power systems from such undesired conditions.

2. Background

Aircraft may employ various electronic devices and systems to perform various functions on the aircraft. Power for the electronic devices and systems on an aircraft may be provided by an aircraft power system. The aircraft power system may include a number of generators along with various power distribution and conversion systems. For example, a number of generators may be driven by the aircraft engines. Feeder lines may carry generated power from the generators to the various power distribution and conversion systems.

Power conversion systems on aircraft may include, for example, rectifiers and transformers. Rectifiers may be used to provide direct current (DC) power from the alternating current (AC) power provided by the generators. Transformers may be used to provide various levels of AC and DC power. Power distribution systems on aircraft may include AC and DC buses and various feeder lines for carrying power between the buses and between the buses and various loads on the aircraft.

It is desirable to protect the components of an aircraft power system from undesired conditions that may occur in the power system. An example of such an undesired condition is a fault condition that results in a subtransient fault current.

A fault current is a current in a power system resulting from a fault. A fault current may rise relatively quickly after a fault occurs and then may decline. A relatively short surge of current resulting from a fault may be referred to as a transient fault current. Subtransient fault current may refer to a portion of a transient fault current. For example, subtransient fault current may refer to the portion of a transient fault current that occurs immediately after a fault. For example, without limitation, subtransient fault current may be a transient current resulting from a fault in a power system that occurs during approximately the first half-cycle or one or more cycles after the fault occurs. Subtransient fault currents typically represent the highest level of transient currents resulting from a fault. The magnitude of subtransient fault currents may be three to four times the magnitude of normal steady state fault currents.

A subtransient fault current in an aircraft power system may be caused when a hard fault occurs on the main generator bus of the power system. Energy is stored in the generator air gaps and magnetics. When a hard fault occurs on the main bus, all this energy is discharged into the fault.

The duration of a subtransient fault current is typically relatively short. For example, a subtransient fault current may only exist for a few milliseconds after a fault occurs. In an aircraft power system, after this relatively short period, a generator control unit on the aircraft may regulate the current on the generator bus back to allowable fault current limits.

It is desirable that protective and power control devices in an aircraft power system are sized to withstand undesired conditions which may occur in the aircraft power system, such as subtransient fault currents and other undesired conditions. As the power generating capabilities of aircraft power systems increase, it is desirable to increase the capability of the protective and power control devices used in aircraft power systems to resist higher fault current levels.

The ability to withstand higher fault current levels may be achieved by increasing the size of the protective and power control devices in an aircraft power system. However, using larger protective and power control devices in aircraft power systems may increase aircraft weight, which may increase aircraft operating costs in an undesired manner. Furthermore, in the past, suppliers have used contact materials with undesired characteristics to withstand subtransient fault currents. As an alternative, fusible links may be used to provide backup protection for protective and power control devices in aircraft power systems.

An overvoltage transient is another example of an undesired condition that may occur in an aircraft power system. An overvoltage transient is a relatively large and sudden spike in voltage in the power system. An overvoltage transient in a power system may be caused by various events.

An overvoltage transient may be the result of fault clearing in a power system. For example, a momentary voltage spike may occur at a location in a power system when a fault downstream from the location is cleared by a contactor downstream from the location. Such an overvoltage transient may occur even if the generator in the power system is de-excited almost immediately by a generator control unit.

As another example, an overvoltage transient in a power system may be caused by a lightning strike. The duration of an overvoltage transient caused by a lightning strike typically may be shorter than the duration of an overvoltage transient resulting from fault clearing in the power system. The energy of an overvoltage transient resulting from a lightning strike may be relatively limited due to the shorter duration of the transient.

It is desirable to protect the components of an aircraft power system from subtransient currents, overvoltage transients, and other undesired conditions.

Therefore, it would be desirable to have a method and apparatus that takes into account at least some of the issues discussed above, as well as other possible issues.

SUMMARY

The illustrative embodiments of the present disclosure provide a method of suppressing a subtransient current and an overvoltage in a power system. The subtransient current is identified at a location in the power system. The subtransient current at the location in the power system is directed to ground for a time delay in response to identifying the subtransient current at the location in the power system. Directing the subtransient current at the location in the power system to ground is ceased in response to identifying an end of the time delay. The overvoltage is identified at the location in the power system. The overvoltage at the location in the power system is suppressed in response to identifying the overvoltage at the location in the power system.

The illustrative embodiments of the present disclosure also provide an apparatus comprising a subtransient current detector, a subtransient current suppressor, an overvoltage transient detector, and an overvoltage transient suppressor. The subtransient current detector is configured to identify a subtransient current at a location in a power system. The subtransient current suppressor is configured to direct the subtransient current at the location in the power system to ground for a time delay in response to the subtransient current detector identifying the subtransient current at the location in the power system and to cease directing the subtransient current at the location in the power system to ground in response to identifying an end of the time delay. The overvoltage transient detector is configured to identify an overvoltage at the location in the power system. The overvoltage transient suppressor is configured to suppress the overvoltage at the location in the power system in response to the overvoltage transient detector identifying the overvoltage at the location in the power system.

The illustrative embodiments of the present disclosure also provide another method of suppressing a subtransient current and an overvoltage in a power system. The subtransient current is identified at a location in the power system. A switch connecting the location in the power system to ground is closed to direct the subtransient current at the location in the power system to ground for a time delay in response to identifying the subtransient current at the location in the power system. The switch is opened to cease directing the subtransient current at the location in the power system to ground in response to identifying an end of the time delay. The overvoltage is identified at the location in the power system. The switch connecting the location in the power system to ground is closed to suppress the overvoltage at the location in the power system in response to identifying the overvoltage at the location in the power system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The different illustrative embodiments recognize and take into account a number of different considerations. "A number" as used herein with reference to items, means one or more items. For example, "a number of different considerations" means one or more different considerations.

The different illustrative embodiments recognize and take into account that it is desirable to provide safe operation of a power system on an aircraft in the event that undesired conditions occur in the power system. An example of such an undesired condition is a generator fault current.

The different illustrative embodiments recognize and take into account that the generator fault current that may occur on modern commercial aircraft may be higher than on other aircraft. For example, without limitation, the subtransient fault current on modern commercial aircraft has been measured as high as 6000 amps peak.

The different illustrative embodiments recognize and take into account that the potential for relatively high fault current levels on some modern commercial aircraft has resulted in use of circuit breakers and contactors that are oversized, or use of undesired contact materials and fusible links as backup protection. For example, some circuit breaker manufacturers have used silver tungsten, silver tungsten carbide, and silver molybdenum contacts. Such materials may oxidize over time and therefore, may not be desirable materials to use in aircraft power systems.

In accordance with an illustrative embodiment, subtransient, transient, or other fault currents or combinations of fault currents in a power system may be shunted to ground through a low impedance switching device when the fault current exceeds a threshold level. The threshold level may be selected to direct the fault current to ground before the fault current reaches its full potential. The switching device is then opened after a time delay to allow current to flow into the fault. The time delay may be a selected time period. Alternatively, the end of the time delay may be identified when the fault current directed to ground falls below a desired fault current level. The appropriate time delay period for shunting the current to ground to provide subtransient or other fault current suppression may be based on characteristics of the power system. If the fault is real and an overcurrent condition persists in the power system, another protection device in the power system may be opened in response to the overcurrent condition. Since larger fault currents are directed to ground via the switching device, the size of other protection devices in the power system may be reduced.

The different illustrative embodiments also recognize and take into account that it may be desirable to protect a power system on an aircraft from overvoltage transients. An overvoltage transient protection unit or other appropriate system on an aircraft may be configured to identify and suppress a transient voltage condition in the aircraft power system. For example, the overvoltage transient protection unit or other system on the aircraft may be configured to electrically isolate a portion of a power system on an aircraft from an overvoltage in response to identifying the overvoltage in the aircraft power system.

The different illustrative embodiments also recognize and take into account that it may be desirable to combine overvoltage and subtransient protection for the power system on an aircraft. Therefore, illustrative embodiments provide a transient protection unit that is configured to protect a power system from both overvoltage transients and subtransient currents. For example, without limitation, an overvoltage transient protection unit or other system on an aircraft for providing overvoltage transient protection may be modified to also provide subtransient current protection in accordance with an illustrative embodiment.

Illustrative embodiments provide both overvoltage transient protection and subtransient current protection at a location in a power system. For example, an overvoltage in the power system may be suppressed in response to identifying the overvoltage at the location in the power system. Subtransient current in the power system may be suppressed in response to identifying the subtransient current at the location in the power system. For example, the subtransient current may be suppressed by directing the subtransient current in the power system to ground. Suppressing the overvoltage in the power system and other functions of a transient protection unit may be disabled while the transient protection unit is suppressing the subtransient current to prevent undesired effects on the power system.

Figure 1:
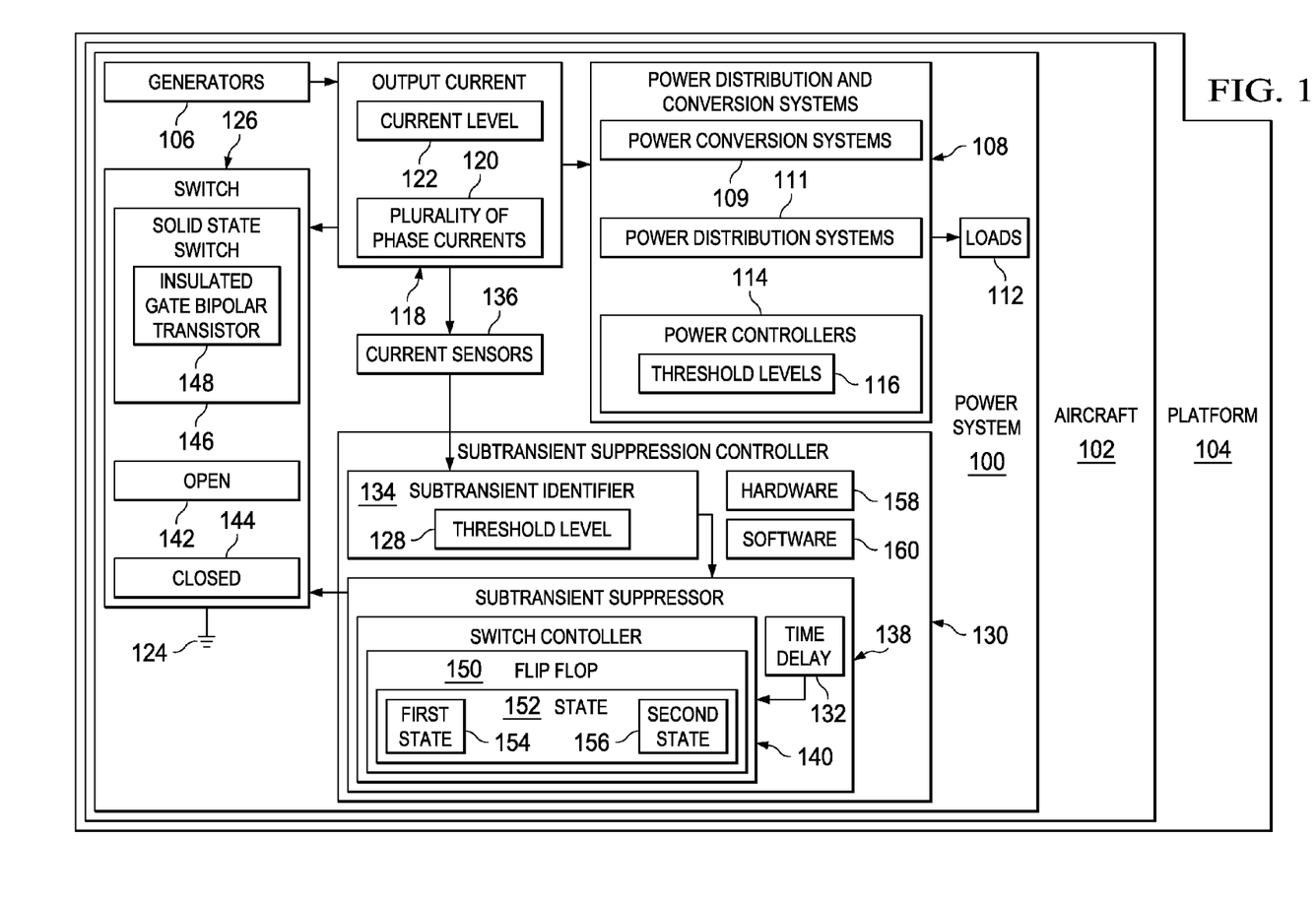
FIG. 1 is an illustration of a block diagram of a power system in accordance with an illustrative embodiment.

Turning now to FIG. 1, an illustration of a block diagram of a power system is depicted in accordance with an illustrative embodiment. In this example, power system 100 may provide electric power for aircraft 102.

Aircraft 102 may be any type of aircraft. For example, without limitation, aircraft 102 may be a fixed wing, rotary wing, or lighter than air aircraft. Aircraft 102 may be configured for carrying passengers, cargo, both passengers and cargo, or may be used for performing any other operation or mission. Aircraft 102 may be operated by an airline, a military unit, or any other private or government entity.

Aircraft 102 is an example of platform 104 in which illustrative embodiments may be implemented. Subtransient and other fault current suppression, in accordance with an illustrative embodiment, may be provided for power system 100 on or for a platform other than aircraft 102. For example, without limitation, platform 104 may be any vehicle that is configured for travelling through the air, in space, on land, on the surface of water, underwater, or in any other operating environment or combination of environments.

Subtransient and other fault current suppression, in accordance with an illustrative embodiment, may be provided for power system 100 on or for a platform other than a vehicle. For example, platform 104 may include any fixed or movable structure that may be provided with electrical power by power system 100.

Power system 100 includes generators 106 and power distribution and conversion systems 108. For example, generators 106 may be driven by operation of the engines of aircraft 102. For example, without limitation, generators 106 may generate variable frequency three-phase AC power that is provided to power distribution and conversion systems 108.

Power distribution and conversion systems 108 may include power conversion systems 109 and power distribution systems 111. Power conversion systems 109 may include devices and systems that are configured to convert the AC power provided by generators 106 to electrical power for loads 112. For example, without limitation, power conversion systems 109 may include rectifiers, transformers, rectifiers and transformers, other electrical power conversion devices or systems, or any combination of electrical power conversion devices or systems. Rectifiers may be used to provide DC power from the AC power provided by generators 106. Transformers may be used to provide various levels of AC and DC power.

Power distribution systems 111 may include structures for distributing the electrical power to loads 112. Power distribution systems 111 also may include a number of AC buses, a number of DC buses, or a number of AC buses and DC buses. Feeder lines may be provided for carrying power between the buses in power distribution and conversion systems 108 and between the buses in power distribution and conversion systems 108 and loads 112.

Loads 112 may include any electrical device or system on aircraft 102 or platform 104 that uses electrical power. Loads 112 may be part of power system 100. For example, without limitation, loads 112 may be part of aircraft 102, or located in or on aircraft 102.

In accordance with an illustrative embodiment, safe operation of power system 100 in the event of undesired conditions in power system 100 may be provided by power controllers 114. For example, power controllers 114 may include various controller and protection devices that may be provided at various locations in power distribution and conversion systems 108 or at other locations or combinations of locations in power system 100. Power controllers 114 may be configured to open contactors or other circuit breakers or to take other appropriate action in response to the identification of undesired conditions at the various locations in power system 100.

For example, without limitation, power controllers 114 may be configured to take appropriate action to protect power system 100 when current levels, voltage levels, or other conditions or combinations of conditions at the various locations in power system 100 are identified as being greater than threshold levels 116. Threshold levels 116 may be selected based on the characteristics of power system 100 so that appropriate action is taken at the appropriate time to protect power system 100 from undesired conditions, or to satisfy other desired conditions or combinations of conditions.

In accordance with an illustrative embodiment, generators 106 provide output current 118 to power distribution and conversion systems 108. For example, in a multi-phase power system, output current 118 may include plurality of phase currents 120. In any case, output current 118 may be defined by current level 122. As a result of a fault in power system 100, output current 118 may include a subtransient fault current or other fault current. In this case, current level 122 may rise to an undesired level.

In accordance with an illustrative embodiment, output current 118 may be directed to ground 124 via switch 126 when current level 122 is greater than threshold level 128. In accordance with an illustrative embodiment, subtransient suppression controller 130 may be configured to identify when current level 122 is greater than threshold level 128 and to control switch 126 to direct output current 118 to ground 124 when current level 122 is greater than threshold level 128. In accordance with an illustrative embodiment, subtransient suppression controller 130 also is configured to control switch 126 to stop directing output current 118 to ground 124 after time delay 132. Stopping directing output current 118 to ground 124 also may be referred to as ceasing directing output current 118 to ground 124.

In accordance with an illustrative embodiment, subtransient suppression controller 130 may include subtransient identifier 134 for identifying when current level 122 is greater than threshold level 128. Subtransient identifier 134 may be configured to monitor current level 122 and to compare current level 122 to threshold level 128. Threshold level 128 may be a fixed threshold level or may be set or changed by an operator. For example, a function implemented using software in subtransient suppression controller 130 may allow a user to set or change threshold level 128 as appropriate for different aircraft or for other reasons.

Current sensors 136 may be used to sense output current 118. For example, without limitation, current sensors 136 may include current transformers or any other devices for sensing output current 118. The output of current sensors 136 may be provided to subtransient identifier 134 and used by subtransient identifier 134 to identify current level 122 and to determine whether current level 122 is greater than threshold level 128. The output of current sensors 136 also may be used to identify when the level of output current 118 directed to ground 124 falls below a desired current level.

In response to identifying current level 122 greater than threshold level 128, subtransient identifier 134 may activate subtransient suppressor 138 to suppress the undesired high current level 122 of output current 118. For example, subtransient suppressor 138 may be a part of subtransient suppression controller 130 that is configured to suppress the undesired current level 122 of output current 118 by directing output current 118 to ground 124 for time delay 132. Time delay 132 may be a selected time period established by an appropriate timer device or function. Alternatively, the end of time delay 132 may be identified when the level of output current 118 directed to ground 124 falls below a desired fault current level.

Subtransient suppressor 138 may include switch controller 140. Switch controller 140 may be configured to generate appropriate control signals for opening and closing switch 126. For example, during normal operation of power system 100, switch 126 may be open 142. When switch 126 is open 142, no current flows through switch 126. In particular, when switch 126 is open 142, output current 118 is not directed to ground 124 via switch 126.

When switch 126 is closed 144, output current 118 may flow through switch 126 to ground 124. Thus, switch controller 140 may be configured to close switch 126 in response to identifying current level 122 greater than threshold level 128.

Switch 126 may be implemented as solid state switch 146 that provides low impedance for output current 118 flowing through switch 126 to ground 124 when switch 126 is closed 144. For example, without limitation, solid state switch 146 may be insulated gate bipolar transistor 148 or another appropriate solid state switching device. As another example, solid state switch 146 may be implemented using a combination of switching or other devices.

In accordance with an illustrative embodiment, switch 126 may be located as close to generators 106 as possible. Locating switch 126 close to generators 106 may take advantage of the impedance of feeder lines extending from generators 106 to power distribution and conversion systems 108 to force more of output current 118 to go through switch 126 to ground 124. In many cases, the impedance of such feeder lines may be greater than the impedance of switch 126.

For example, without limitation, generators 106 may be driven by aircraft engines located on the wings of aircraft 102. Generator feeder lines may carry power from generators 106 located on the wings of aircraft 102 to power distribution and conversion systems 108 in the main body of aircraft 102. In this case, it may be desirable to locate switch 126 near generators 106 on the wings of aircraft 102 to take advantage of the relatively high impedance of the generator feeder lines from generators 106 to the main body of aircraft 102 to force more of output current 118 to go through switch 126 to ground 124.

In accordance with an illustrative embodiment, switch controller 140 may be configured to automatically open switch 126 after time delay 132. Time delay 132 may be a selected time period. Alternatively, the end of time delay 132 may be identified when the level of output current 118 directed to ground 124 falls below a desired fault current threshold level.

Time delay 132 may be a fixed time period or may be based on a fixed current threshold level. Alternatively, the time period or threshold level for time delay 132 may be set or changed by an operator. For example, a function implemented using software in subtransient suppression controller 130 may allow a user to set or change time delay 132 as appropriate for different aircraft or for other reasons.

For example, without limitation, subtransient suppressor 138 may be configured to start a counter or other device for measuring time delay 132 at approximately the same time that switch controller 140 closes switch 126 in response to current level 122 being identified as greater than threshold level 128. In this example, switch controller 140 may be configured to open switch 126 automatically in response to identifying the end of time delay 132. In another example, switch controller 140 may be configured to open switch 126 automatically in response to identifying output current 118 directed to ground 124 that falls below a desired fault current threshold level.

In one example, switch controller 140 may include flip flop 150 or another appropriate device for latching state 152. For example, state 152 of flip flop 150 may be either first state 154 or second state 156. When flip flop 150 is in first state 154, the output of switch controller 140 may control switch 126 to remain open 142. When flip flop 150 is in second state 156, the output of switch controller 140 may control switch 126 to be closed 144. State 152 of flip flop 150 may change automatically from first state 154 to second state 156 in response to an indication that current level 122 of output current 118 is greater than threshold level 128. State 152 of flip flop 150 may change automatically from second state 156 back to first state 154 in response to identifying the end of time delay 132.

The functions performed by subtransient suppression controller 130 as described herein may be implemented in hardware 158 or in hardware 158 and software 160. In cases where the functions performed by subtransient suppression controller 130 are implemented in hardware 158 and software 160, subtransient suppression controller 130 may include a programmable processor unit for running software 160 to perform the desired functions. For example, without limitation, the processor unit may be a microprocessor, other processor unit, or a combination of processor units. Such a processor unit may be provided in either a general or special purpose computer or other computing device.

The processor unit may serve to run instructions for software 160 that may be loaded into memory, persistent storage, or both. The processor unit may be a number of processors, a multi-processor core, or some other type of processor, depending on the particular implementation. Further, the processor unit may be implemented using a number of heterogeneous processor systems in which a main processor is present with secondary processors on a single chip. As another illustrative example, the processor unit may be a symmetric multi-processor system containing multiple processors of the same type.

The processes of the different embodiments may be performed by the processor unit using software 160 in the form of computer-implemented instructions. Instructions for controlling the processor unit to perform the desired functions in accordance with illustrative embodiments may be located in storage devices which are in communication with the processor unit. For example, without limitation, the instructions may be in a functional form on persistent storage. These instructions may be loaded into memory for execution by the processor unit.

These instructions may be referred to as program instructions, program code, computer usable program code, or computer readable program code that may be read and executed by the processor unit. The program code in the different embodiments may be embodied on different physical or computer readable storage media, such as memory or persistent storage.

In another illustrative example, the functionality of subtransient suppression controller 130 may be implemented in a hardware unit that has circuits that are manufactured or configured for a particular use, such as hardware 158. This type of hardware may perform operations without needing program code to be loaded into a memory from a storage device to be configured to perform the operations.

For example, without limitation, such a hardware unit may be a circuit system, an application specific integrated circuit (ASIC), a programmable logic device, or some other suitable type of hardware configured to perform a number of operations. With a programmable logic device, the device is configured to perform the number of operations. The device may be reconfigured at a later time or may be permanently configured to perform the number of operations. Examples of programmable logic devices include, without limitation, a programmable logic array, a programmable array logic, a field programmable logic array, a field programmable gate array, and other suitable hardware devices. With this type of implementation, program code may be omitted, because the processes for the different embodiments are implemented in a hardware unit.

In still another illustrative example, the functionality provided by subtransient suppression controller 130 may be implemented using a combination of processors found in computers and hardware units. Subtransient suppression controller 130 may include a number of hardware units and a number of processors that are configured to perform the desired functions. In this example, some of the functionality provided by subtransient suppression controller 130 may be implemented in the number of hardware units while other processes may be implemented in the number of processors.

In yet another illustrative example, the functionality provided by subtransient suppression controller 130 may be implemented using discrete circuit components, either alone or in combination with hardware units, processor units, or both.

Figure 2:
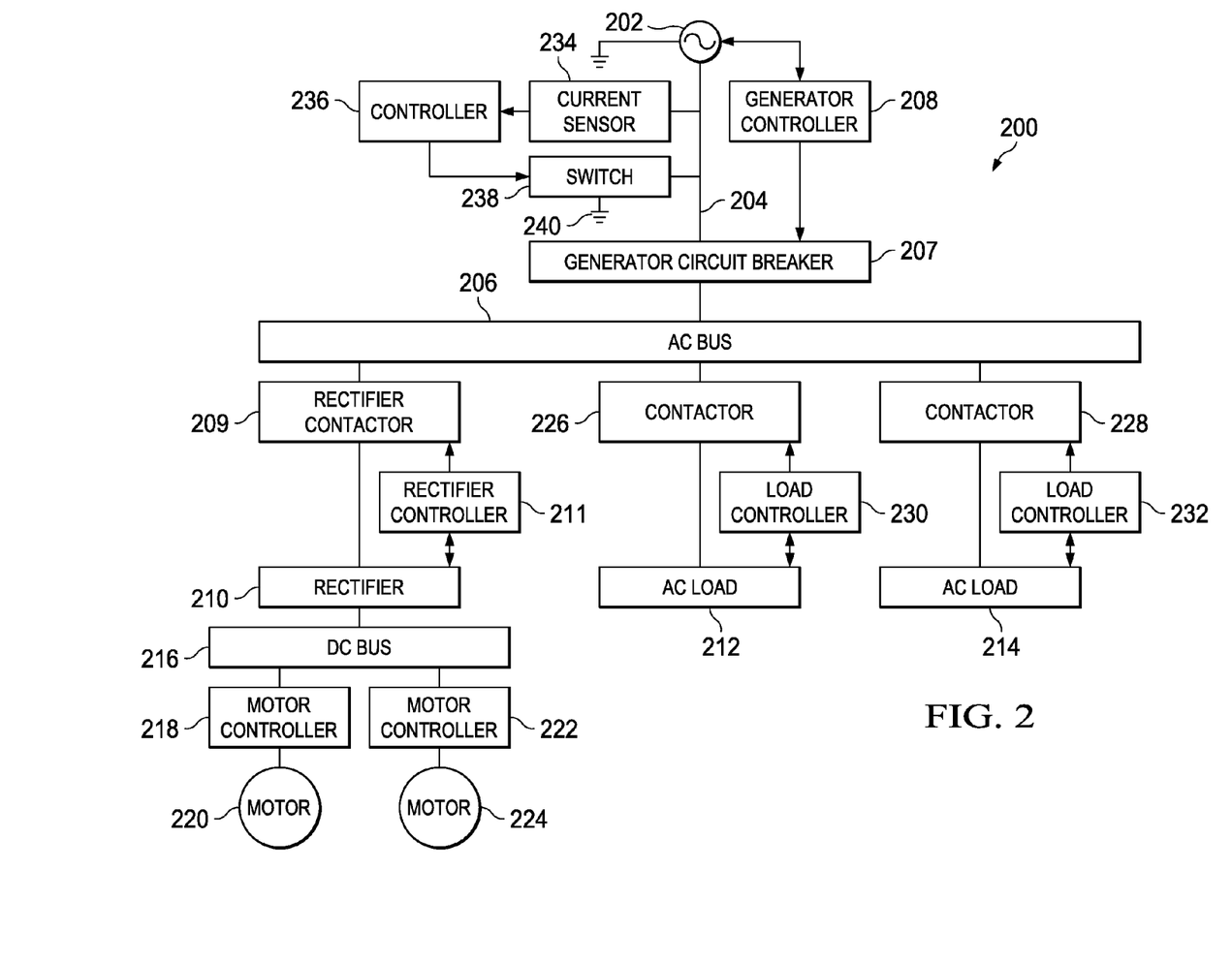
FIG. 2 is an illustration of a block diagram of an aircraft power system in accordance with an illustrative embodiment.

Turning now to FIG. 2, an illustration of a block diagram of an aircraft power system is depicted in accordance with an illustrative embodiment. In this example, power system 200 may be an example of an implementation of a portion of power system 100 for aircraft 102 in FIG. 1.

Power system 200 includes generator 202. Generator 202 may be driven by an engine on an aircraft. For example, without limitation, generator 202 may generate variable frequency three-phase AC power. Generator feeder lines 204 may carry the generated AC power from generator 202 to AC bus 206.

Generator circuit breaker 207 may be provided on generator feeder lines 204. Generator circuit breaker 207 may be any device that is configured to disconnect AC bus 206 from generator 202 when generator circuit breaker 207 is opened. For example, without limitation, generator circuit breaker 207 may be controlled by generator controller 208 to disconnect AC bus 206 from generator 202 in response to the identification of an undesired condition in power system 200.

AC bus 206 is configured to distribute the AC power provided by generator 202 to various loads. For example, without limitation, AC bus 206 may be configured to distribute the AC power provided by generator 202 to rectifier 210, AC load 212, and AC load 214.

Rectifier contactor 209 may be provided between AC bus 206 and rectifier 210. Rectifier contactor 209 may be any device that is configured to disconnect rectifier 210 from AC bus 206 when rectifier contactor 209 is opened. For example, without limitation, rectifier contactor 209 may be controlled by rectifier controller 211 to disconnect rectifier 210 from AC bus 206 in response to the identification of an undesired condition in power system 200.

Rectifier 210 may be configured to convert the AC power provided on AC bus 206 to DC power. Rectifier 210 may be any AC to DC power converter. DC power from rectifier 210 may be provided on DC bus 216.

Various DC loads may be powered by the DC power on DC bus 216. For example, without limitation, such DC loads may include motor controller 218, motor 220, motor controller 222, and motor 224. In alternative embodiments, DC loads connected to DC bus 216 may include a single motor and motor controller or more than two motors and motor controllers. In another alternative embodiment, the DC loads connected to DC bus 216 may additionally or alternatively comprise a number of DC loads other than motors and motor controllers.

Motors 220 and 224 may be any type of electric motor. For example, without limitation, motors 220 and 224 may be induction motors, permanent magnet motors, synchronous motors with independent excitation, or any other type of electric motor. Motors 220 and 224 may be the same or different types of motors.

Motor controllers 218 and 222 may be any type of motor controllers that are appropriate for controlling motors 220 and 224, respectively. Depending on the type of motor to be controlled, motor controllers 218 and 222 may be of any appropriate size and complexity. In one example, motor controller 218, motor controller 222, or both may be solid state multifunctional motor controllers that provide power conversion for driving motor 220 or motor 224, respectively. A motor controller of this type may be used to drive various types of motors and motor loads.

AC loads 212 and 214 may be any number of AC loads. Contactor 226 may be provided between AC bus 206 and AC load 212. Contactor 228 may be provided between AC bus 206 and AC load 214. Contactors 226 and 228 may be any devices that are configured to disconnect AC load 212 from AC bus 206 when contactor 226 is opened and to disconnect AC load 214 from AC bus 206 when contactor 228 is opened. For example, without limitation, contactor 226 may be controlled by load controller 230 to disconnect AC load 212 from AC bus 206 in response to the identification of an undesired condition in power system 200. Contactor 228 may be controlled by load controller 232 to disconnect AC load 214 from AC bus 206 in response to the identification of an undesired condition in power system 200.

In this example, rectifier 210 is an example of one of power conversion systems 109 in FIG. 1. AC bus 206 and DC bus 216 are examples of power distribution systems 111 in FIG. 1. Generator controller 208, rectifier controller 211, load controller 230, and load controller 232 are examples of power controllers 114 in FIG. 1.

In this example, current sensor 234 may be configured to sense the current at the output of generator 202. The output of current sensor 234 may be provided to controller 236. In this example, controller 236 is an example of subtransient suppression controller 130 in FIG. 1.

Controller 236 may use the output provided by current sensor 234 to identify a level of the current provided from generator 202 to AC bus 206 on generator feeder lines 204 and to determine whether the level of the current from generator 202 is greater than a threshold level. In response to identifying a level of current that is greater than the threshold level, controller 236 may close switch 238 to direct the current from generator 202 to ground 240 for a selected time period. Controller 236 may open switch 238 to stop directing the current from generator 202 to ground 240 in response to identifying the end of the selected time period or when a desired fault current level has been obtained.

The illustrations of FIG. 1 and FIG. 2 are not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, without limitation, a subtransient suppression controller in accordance with an illustrative embodiment may perform a functionality test each time the system is powered up. This functionality test may be implemented in software in the subtransient suppression controller.

Figure 3:
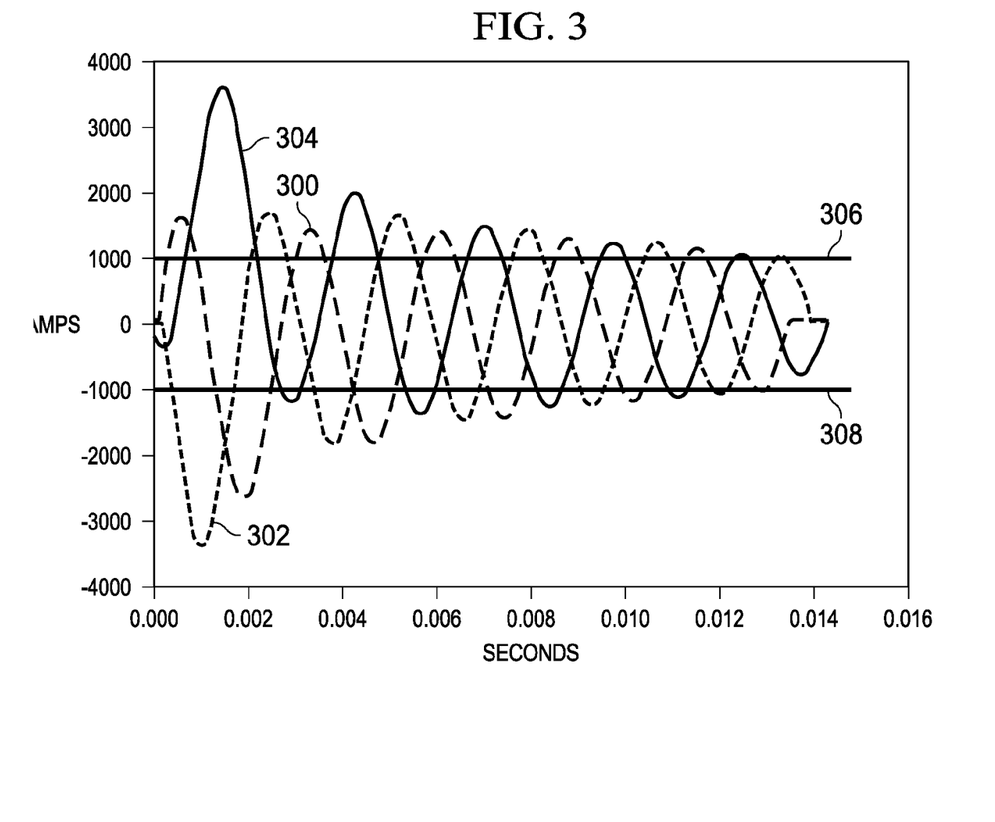
FIG. 3 is an illustration of a waveform diagram of transient currents and threshold levels in accordance with an illustrative embodiment.

Turning now to FIG. 3, an illustration of a waveform diagram of transient currents and threshold levels is depicted in accordance with an illustrative embodiment. In this example, waveforms 300, 302, and 304 illustrate the levels of three phase currents in amps over a period of time. In this example, line 306 indicates a threshold level at 1000 amps and line 308 indicates a threshold level at −1000 amps. In accordance with an illustrative embodiment, the currents represented by waveforms 300, 302, and 304 may be directed to ground for a selected time period in response to identifying a level of any one of the phase currents represented by waveforms 300, 302, and 304 that is greater, in absolute value, than the threshold levels indicated by lines 306 and 308. In this example, if the time period is selected to be approximately 0.015 seconds, the peak current levels of the phase currents represented by waveforms 300, 302, and 304 would be within the threshold levels indicated by lines 306 and 308 when directing the phase currents to ground is stopped.

Figure 4:
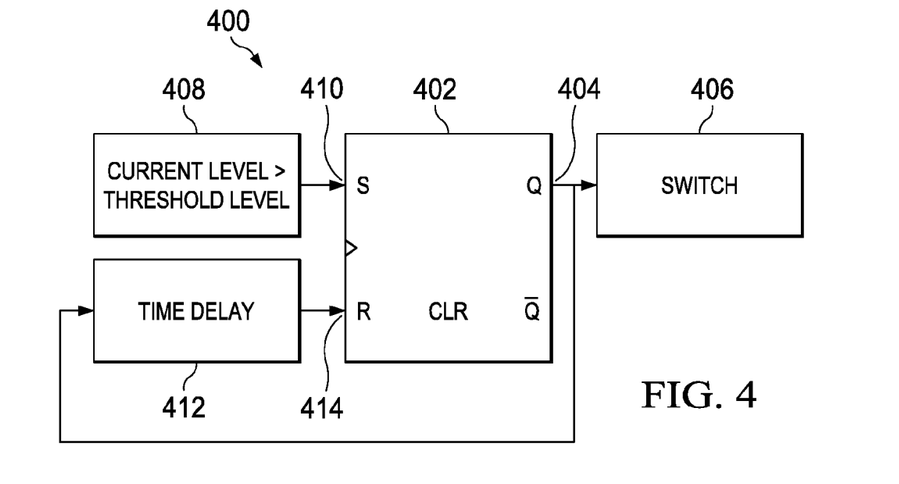
FIG. 4 is an illustration of a block diagram of a switch controller in accordance with an illustrative embodiment.

Turning now to FIG. 4, an illustration of a block diagram of a switch controller is depicted in accordance with an illustrative embodiment. In this example, switch controller 400 is an example of one implementation of switch controller 140 in FIG. 1.

In this example, switch controller 400 includes flip flop 402. Output Q 404 of flip flop 402 is connected to switch 406. Output Q 404 of flip flop 402 is set in response to an indication that current level is greater than threshold level 408 received at input S 410 of flip flop 402. Switch 406 may be closed in response to setting output Q 404 of flip flop 402.

Output Q 404 of flip flop 402 is connected via time delay 412 to input R 414 of flip flop 402. Thus, output Q 404 of flip flop 402 is cleared after time delay 412 in response to setting output Q 404 of flip flop 402. Switch 406 may be opened in response to clearing output Q 404 of flip flop 402.

Time delay 412 may be a timer device or function that is initiated to start timing a selected time period when output Q 404 of flip flop 402 is set. In this case, output Q 404 of flip flop 402 may be cleared in response to the timer device or function indicating the end of the selected time period. Alternatively, time delay 412 may include a device or function for identifying a fault current level that falls below a desired fault current level. In this case, output Q 404 of flip flop 402 may be cleared in response to the device or function identifying a fault current level that falls below the desired fault current level.

Figure 5:
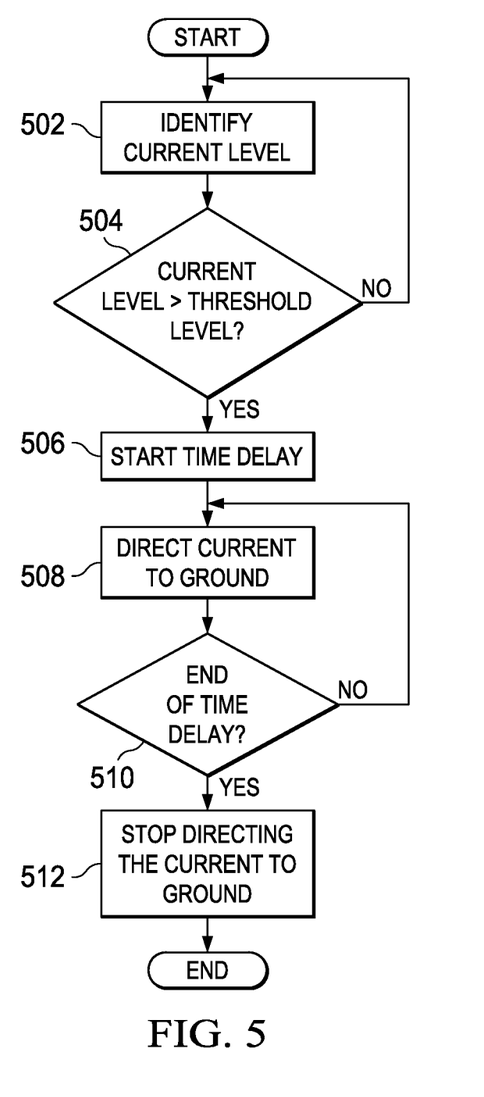
FIG. 5 is an illustration of a flowchart of a process for subtransient current suppression in accordance with an illustrative embodiment.

Turning now to FIG. 5, an illustration of a flowchart of a process for subtransient current suppression is depicted in accordance with an illustrative embodiment. The process of FIG. 5 may be implemented, for example, by subtransient suppression controller 130 in FIG. 1.

The process begins by identifying a current level in a power system (operation 502). It then may be determined whether the current level is greater than a threshold level (operation 504). If the current level is not greater than the threshold level, the process returns to operation 502. Operations 502 and 504 may be repeated until a current level that is greater than the threshold level is identified.

If it is determined at operation 504 that the current level is greater than the threshold level, a time delay may be started (operation 506) and the current may be directed to ground (operation 508). For example, the current may be directed to ground by closing a solid state switch. It then may be determined whether the time delay is ended (operation 510). For example, the time delay may be ended after a selected time period or when the current directed to ground falls below a desired current level. If the time delay is not ended, the process returns to operation 508 and the current continues to be directed to ground until the time delay is ended. If it is determined at operation 510 that the time delay is ended, directing the current to ground is stopped (operation 512), with the process terminating thereafter. For example, stopping directing the current to ground may include opening the solid state switch.

Figure 6:
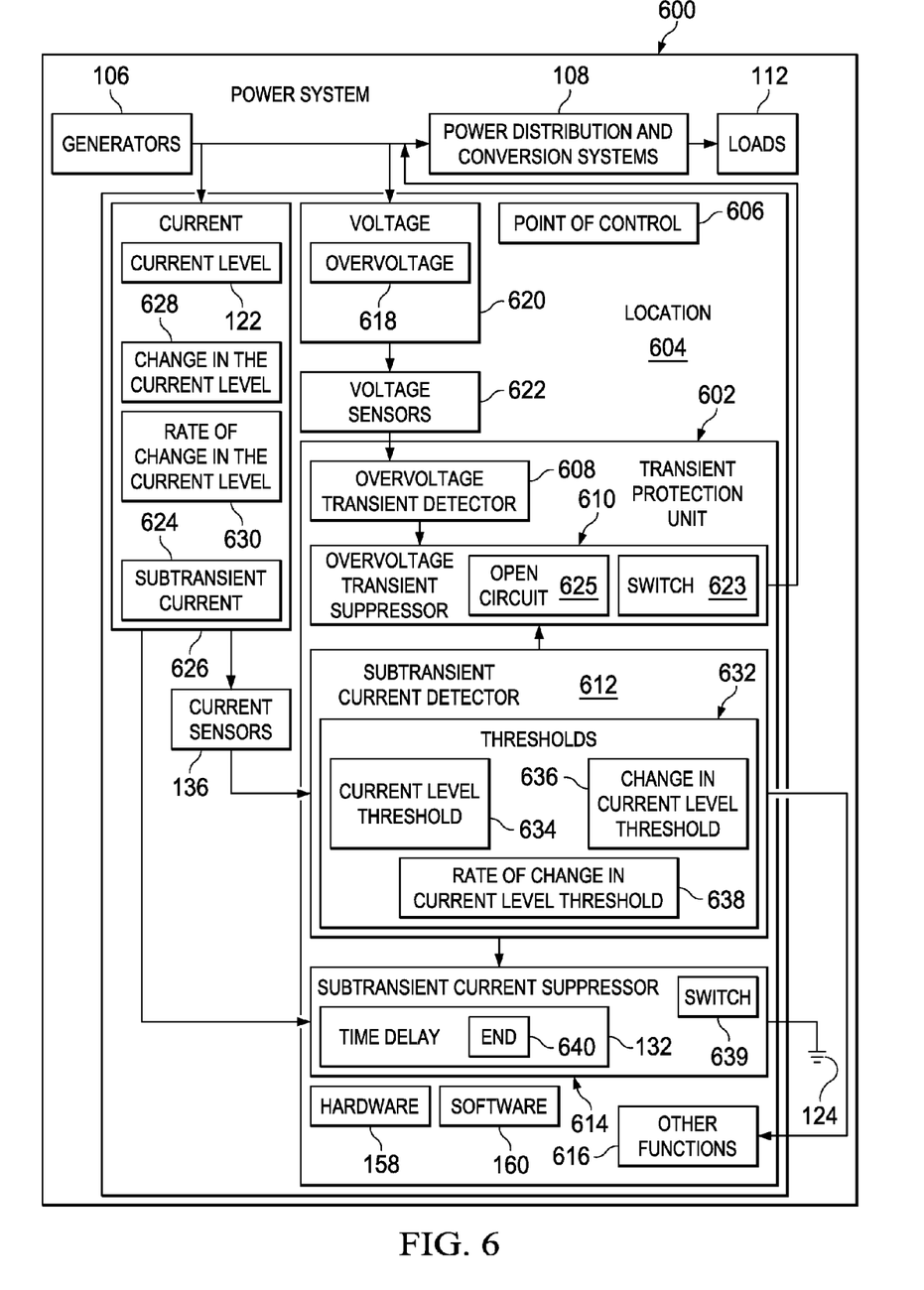
FIG. 6 is an illustration of a block diagram of a power system in accordance with another illustrative embodiment.

Turning to FIG. 6, an illustration of a block diagram of a power system is depicted in accordance with another illustrative embodiment. Some items in FIG. 6 are referred to by the reference numbers that are used to refer to the same or similar items in FIG. 1. Further description of these items may be provided in the description of FIG. 1 herein. For example, without limitation, power system 600 may be an example of a power system for aircraft 102 or other platform 104 in FIG. 1.

Transient protection unit 602 may be configured to provide protection for power system 600 from both overvoltage and subtransient current at location 604 in power system 600. Location 604 may be any appropriate location in power system 600. For example, without limitation, location 604 may be the output of generators 106, between generators 106 and power distribution and conversion systems 108, in power system 600, or any other appropriate location in power system 600.

For example, without limitation, location 604 may be any appropriate point of control 606 in power system 600. Point of control 606 may be any location 604 in power system 600 at which the power provided by power system 600 is controlled. For example, without limitation, the power provided by power system 600 may be controlled at the output of generators 106. In this case, point of control 606 may be location 604 in power system 600 at the output of generators 106.

Location 604 may or may not be a single physical point in power system 600. Location 604 may refer to various different physical points on an electrical connection between components of power system 600. For example, different physical points along the wires or other connectors providing a connection between components of power system 600 may be considered the same location 604 in power system 600.

Transient protection unit 602 may comprise overvoltage transient detector 608, overvoltage transient suppressor 610, subtransient current detector 612, and subtransient current suppressor 614. Overvoltage transient detector 608 and overvoltage transient suppressor 610 may be configured to provide overvoltage transient protection for power system 600. Subtransient current detector 612 and subtransient current suppressor 614 may be configured to provide subtransient current protection for power system 600. Transient protection unit 602 also may be configured to perform other functions 616 related to protecting power system 600 from undesired electrical conditions or other conditions that may occur in power system 600. The various functions performed by transient protection unit 602 as described herein may be implemented in hardware 158 or in hardware 158 and software 160.

Overvoltage transient detector 608 may be configured to identify overvoltage 618 at location 604 in power system 600. For example, without limitation, overvoltage 618 may be a characterized by a relatively rapid increase in the level of voltage 620 at location 604 in power system 600 to an undesirably high level of voltage 620. Overvoltage 618 may be a transient voltage that declines after rising rapidly. Appropriate voltage sensors 622 may be used to detect the level or other characteristics of voltage 620 at location 604 in power system 600. Overvoltage transient detector 608 may be configured to use the characteristics of voltage 620 detected using voltage sensors 622 to identify overvoltage 618 at location 604 in power system 600 in any appropriate manner.

Overvoltage transient suppressor 610 may be configured to suppress overvoltage 618 in power system 600 in response to overvoltage transient detector 608 identifying overvoltage 618 at location 604 in power system 600. Suppressing overvoltage 618 may refer to any appropriate action performed or initiated by overvoltage transient suppressor 610 to reduce undesired effects of overvoltage 618 in power system 600.

For example, without limitation, overvoltage transient suppressor 610 may comprise switch 623 connected in parallel with the portion of power system 600 to be protected from overvoltage 618. For example, switch 623 may be connected between the terminals of generators 106 at location 604 in power system 600. Alternatively, switch 623 may be connected between location 604 at point of control 606 in power system 600 and ground 124. Switch 623 may comprise an insulated gate bipolar transistor or any other appropriate solid state or other switching device.

Switch 623 may be closed by overvoltage transient suppressor 610 for a relatively short period of time in response to the identification of overvoltage 618 in power system 600 by overvoltage transient detector 608. In this case, closing switch 623 creates a short circuit at the terminals of generators 106 or between location 604 in power system 600 and ground 124. This causes overvoltage 618 to collapse and thus protects power system 600 from undesired effects of overvoltage 618.

As another example, overvoltage transient suppressor 610 may be configured to electrically isolate a portion of power system 600 from overvoltage 618 in response to the identification of overvoltage 618 in power system 600. In this case, switch 623 may be connected in series with generator feeder lines providing power from generators 106 to power distribution and conversion systems 108 in power system 600. In this case, overvoltage transient suppressor 610 may be configured to open switch 623, thereby creating open circuit 625 to isolate generators 106 from power distribution and conversion systems 108 and loads 112 in power system 600, in response to the identification of overvoltage 618 on the generator feeder lines between generators 106 and power distribution and conversion systems 108 in power system 600.

Subtransient current detector 612 may be configured to identify subtransient current 624 at location 604 in power system 600. Subtransient current 624 may be an undesired current 626 at location 604 in power system 600. Subtransient current 624 may be a fault current resulting from a fault in power system 600, another cause, or various combinations of causes. For example, without limitation, subtransient current 624 may be a portion of a transient current resulting from a fault in power system 600 that occurs immediately after the fault occurs. Subtransient current 624 may represent the highest level of transient currents resulting from a fault in power system 600.

Current 626 at location 604 in power system 600 may be defined by one or more of current level 122, change in the current level 628, and rate of change in the current level 630. Change in the current level 628 may refer to an amount of change in current level 122. Rate of change in the current level 630 may refer to the rate of change of current level 122.

Current sensors 136 may be used to detect a number of characteristics of current 626 at location 604 in power system 600. For example, without limitation, current sensors 136 may include differential protection current transformers, other current transformers, or any other appropriate devices for detecting one or more of current level 122, change in the current level 628, and rate of change in the current level 630 at location 604 in power system 600.

The characteristics of current 626 detected using current sensors 136 may be used by subtransient current detector 612 to identify subtransient current 624 at location 604 in power system 600. For example, without limitation, subtransient current detector 612 may be configured to identify subtransient current 624 by identifying current level 122 that is greater than current level threshold 634. Alternatively, or in addition, subtransient current detector 612 may be configured to identify subtransient current 624 by identifying change in the current level 628 that is greater than change in current level threshold 636. Alternatively, or in further addition, subtransient current detector 612 may be configured to identify subtransient current 624 by identifying rate of change in the current level 630 that is greater than rate of change in current level threshold 636.

Values for current level threshold 634, change in current level threshold 636, and rate of change in current level threshold 638 may be selected to provide desired protection from subtransient current 624 for power system 600. Values for each of current level threshold 634, change in current level threshold 636, and rate of change in current level threshold 638 may be fixed or may be set or changed by a human operator using an appropriate operator interface.

Subtransient current suppressor 614 may be configured to suppress subtransient current 624 in power system 600 in response to subtransient current detector 612 identifying subtransient current 624 at location 604 in power system 600. Suppressing subtransient current 624 may refer to any appropriate action performed or initiated by subtransient current suppressor 614 to reduce undesired effects of subtransient current 624 in power system 600. For example, subtransient current suppressor 614 may be configured to direct subtransient current 624 to ground 124 for time delay 132 in response to the identification of subtransient current 624 at location 604 in power system 600. For example, without limitation, subtransient current suppressor 614 may comprise switch controller 400 in FIG. 4 or another appropriate switch controller for controlling an insulated gate bipolar transistor or other appropriate switch 639 to direct subtransient current 624 at location 604 in power system 600 to ground 124 for time delay 132. Subtransient current suppressor 614 may be configured to cease directing subtransient current 624 to ground 124 in response to identifying end 640 of time delay 132. Ceasing directing subtransient current 624 to ground 124 also may be referred to as stopping directing subtransient current 624 to ground 124.

Time delay 132 may be a selected duration of time. In this case, end 640 of time delay 132 may be identified using an appropriate timer device or function. Alternatively, end 640 of time delay 132 may be identified when current level 122 at location 604 in power system 600 falls below current level threshold 634 or another appropriate level.

Overvoltage transient suppressor 610 and subtransient current suppressor 614 may use the same switching circuit to provide suppression of both overvoltage 618 and subtransient current 624. In other words, switch 623 in overvoltage transient suppressor 610 and switch 639 in subtransient current suppressor 614 may be implemented using the same switching device. This switching device may be switched to shunt current 626 in power system 600 to ground 124 by overvoltage transient suppressor 610 when overvoltage 618 is identified by overvoltage transient detector 608 and by subtransient current suppressor 614 when subtransient current 624 is identified by subtransient current detector 612.

Since overvoltage 618 may be caused by fault clearing, transient protection unit 602 may provide both overvoltage and subtransient current protection in response to a single fault. For example, subtransient current protection may be provided by subtransient current suppressor 614 in response to subtransient current 624 occurring at the onset of a fault in power system 600. Overvoltage transient protection then may be provided by overvoltage transient suppressor 610 in response to overvoltage 618 resulting from clearing of the fault. Therefore, in the case where overvoltage transient suppressor 610 and subtransient current suppressor 614 use the same switching circuit for transient suppression, the case where switch 623 and switch 639 are the same switch, the switching circuit may be controlled to shunt current 626 to ground 124 for a limited time two times in response to a fault in power system 600.

Transient protection unit 602 may be configured to disable the providing of overvoltage suppression by overvoltage transient suppressor 610 and other functions 616 of transient protection unit 602 while subtransient current suppressor 614 is suppressing subtransient current 624 in power system 600. For example, transient protection unit 602 may be configured to prevent overvoltage transient suppressor 610 from suppressing overvoltage 618 in power system 600 in response to subtransient current detector 612 identifying subtransient current 624 in power system 600. Overvoltage suppression and other functions 616 performed by transient protection unit 602 may be prevented while subtransient current suppressor 614 is suppressing subtransient current 624 to prevent undesired effects in power system 600. For example, without limitation, preventing overvoltage suppression and other functions 616 while subtransient current suppressor 614 is suppressing subtransient current 624 may prevent the undesired de-exciting of generators 106 that may result if overvoltage transient suppression is attempted while subtransient current suppression is in progress. The providing of overvoltage suppression by overvoltage transient suppressor 610 and other functions 616 of transient protection unit 602 may be re-enabled when subtransient current suppression is ceased at end 640 of time delay 132.

Figure 7:
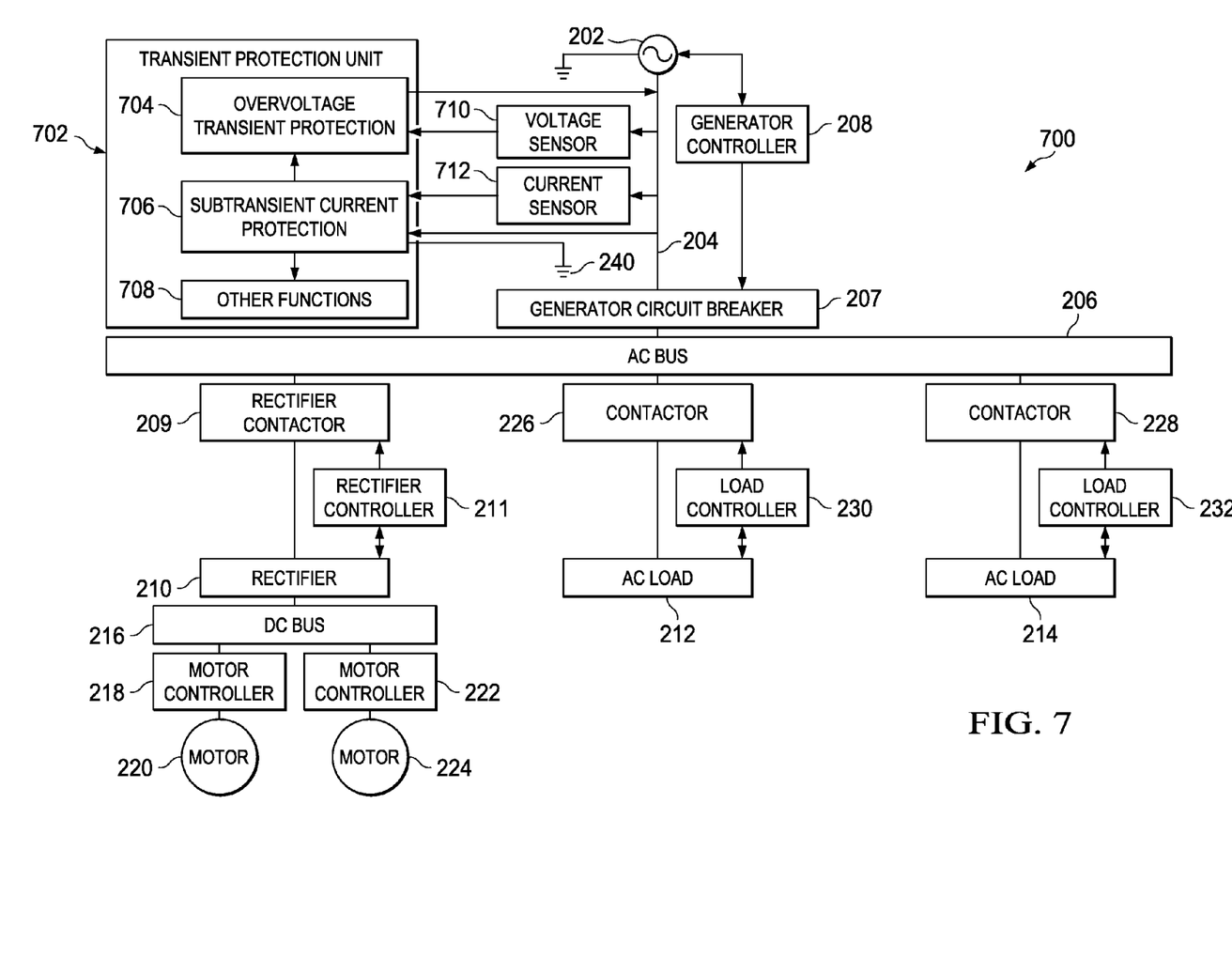
FIG. 7 is an illustration of a block diagram of an aircraft power system in accordance with another illustrative embodiment.

Turning to FIG. 7, an illustration of a block diagram of an aircraft power system is depicted in accordance with another illustrative embodiment. Some items in FIG. 7 are referred to by the reference numbers that are used to refer to the same or similar items in FIG. 2. Further description of these items may be provided in the description of FIG. 2. In this example, power system 700 may be an example of an implementation of a portion of power system 600 in FIG. 6.

Transient protection unit 702 may be configured to provide overvoltage transient protection 704, subtransient current protection 706, and other functions 708 for protecting power system 700 from undesired conditions. For example, without limitation, transient protection unit 702 may be connected to generator feeder lines 204 on either side of generator circuit breaker 207 in power system 700.

Transient protection unit 702 may provide overvoltage transient protection 704 by suppressing an overvoltage on generator feeder lines 204. The overvoltage on generator feeder lines 204 may be identified using an appropriate voltage sensor 710 configured to detect the level or other characteristics of the voltage on generator feeder lines 204. Subtransient current protection 706 may be provided by directing a subtransient current on generator feeder lines 204 to ground 240. The subtransient current on generator feeder lines 204 may be identified using an appropriate current sensor 712 configured to detect a number of characteristics of the current on generator feeder lines 204. Overvoltage transient protection 704 and other functions 708 performed by transient protection unit may be disabled when subtransient current protection 706 is active to prevent undesired effects in power system 700.

The illustrations of FIG. 6 and FIG. 7 are not meant to imply physical or architectural limitations to the manner in which different illustrative embodiments may be implemented. Other components in addition to, in place of, or both in addition to and in place of the ones illustrated may be used. Some components may be unnecessary in some illustrative embodiments. Also, the blocks are presented to illustrate some functional components. One or more of these blocks may be combined or divided into different blocks when implemented in different illustrative embodiments.

For example, without limitation, a transient protection unit in accordance with an illustrative embodiment may be implemented by modifying an overvoltage transient protection unit used to provide overvoltage transient protection for an aircraft power system to provide subtransient current protection in addition to overvoltage transient protection. A transient protection unit configured to provide both overvoltage transient protection and subtransient current protection in accordance with an illustrative embodiment may be implemented by modifying the hardware, the software, or both the hardware and software of an overvoltage transient protection unit as appropriate to provide subtransient current protection in addition to overvoltage transient protection.

Figure 8:
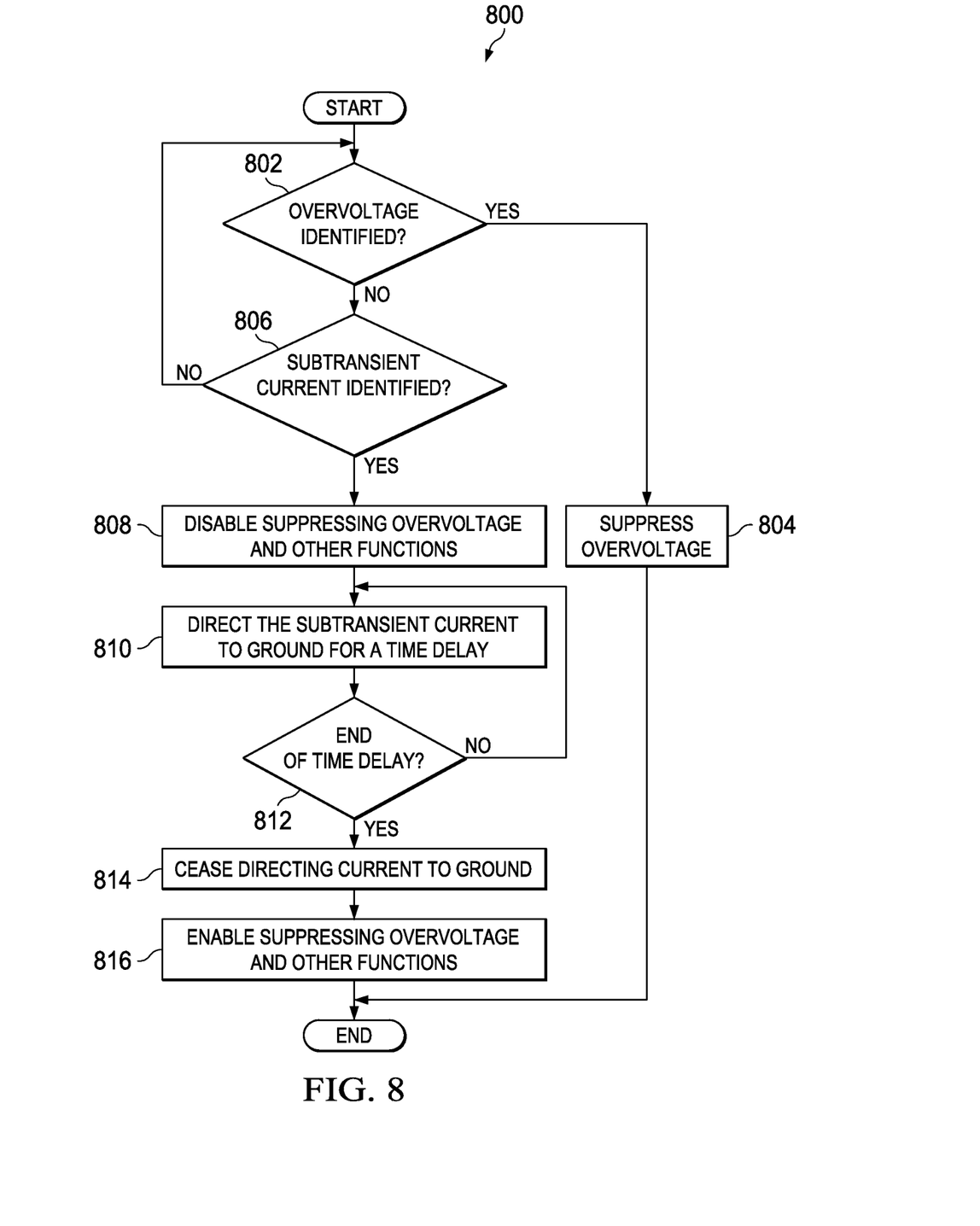
FIG. 8 is an illustration of a flowchart of a process for combined overvoltage protection and subtransient current suppression in accordance with an illustrative embodiment.

Turning to FIG. 8, an illustration of a flowchart of a process for combined overvoltage protection and subtransient current suppression is depicted in accordance with an illustrative embodiment. For example, without limitation, the process of FIG. 8 may be implemented by transient protection unit 602 in FIG. 6 or transient protection unit 702 in FIG. 7.

Process 800 may begin by determining whether an overvoltage is identified at a location in a power system (operation 802). For example, without limitation, an overvoltage may be identified using appropriate voltage sensors at the location in the power system. The overvoltage may be suppressed (operation 804) in response to a determination that an overvoltage has been identified in the power system, with the process terminating thereafter. For example, the overvoltage may be suppressed by directing current at the location in the power system to ground or electrically isolating a portion of the power system from the overvoltage.

In response to a determination at operation 802 that an overvoltage is not identified, it may be determined whether a subtransient current is identified at the location in the power system (operation 806). For example, without limitation, a subtransient current may be identified at the location in the power system in response to identifying one or more of a current level at the location in the power system that is greater than a current level threshold, a change in the current level at the location in the power system that is greater than a change in the current level threshold, and a rate of the change in the current level at the location in the power system that is greater than a rate of change in the current level threshold.

In response to a determination that a subtransient current is not identified at the location in the power system, process 800 may return to operation 802. Operations 802 and 806 may be repeated until an overvoltage or a subtransient current is identified in the power system.

If it is determined at operation 806 that a subtransient current is identified at the location in the power system, the function of suppressing overvoltage and other functions performed by a transient protection unit may be disabled (operation 808) and the subtransient current may be directed to ground for a time delay (operation 810). For example, the subtransient current may be directed to ground by closing a solid state switch.

It then may be determined whether the time delay is ended (operation 812). For example, the time delay may be ended after a selected time period or when the current directed to ground falls below a desired current level. If the time delay is not ended, the process returns to operation 810 and the current continues to be directed to ground until the time delay is ended. If it is determined at operation 812 that the time delay is ended, the directing of the current to ground is ceased (operation 814) and the function of suppressing overvoltage and other functions performed by the transient protection unit may be enabled (operation 816), with the process terminating thereafter.

The flowcharts and block diagrams in the different depicted embodiments illustrate the structure, functionality, and operation of some possible implementations of apparatuses and methods in different illustrative embodiments. In this regard, each block in the flowcharts or block diagrams may represent a module, segment, function, or a portion of an operation or step. In some alternative implementations, the function or functions noted in the blocks may occur out of the order noted in the figures. For example, in some cases, two blocks shown in succession may be executed substantially concurrently, or the blocks may sometimes be executed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method of suppressing a subtransient current and an overvoltage in a power system, comprising:
   identifying, by a subtransient current detector, the subtransient current at a location in the power system, wherein the power system is on an aircraft;
   directing, by a subtransient current suppressor, the subtransient current at the location in the power system to ground for a time delay in response to identifying the subtransient current at the location in the power system;
   ceasing directing the subtransient current at the location in the power system to ground in response to identifying an end of the time delay;
   identifying, by an overvoltage transient detector, the overvoltage at the location in the power system; and
   suppressing, by an overvoltage transient suppressor configure to perform one or more of creating a short at the location or electrically isolating a portion of the power system, the overvoltage at the location in the power system in response to identifying the overvoltage at the location in the power system.

2. The method of claim 1, wherein the location in the power system comprises a point of control in the power system at which power provided by the power system is controlled.

3. The method of claim 1, wherein the location in the power system comprises generator feeder lines on which power is provided from a generator to the power system.

4. The method of claim 1, wherein suppressing the overvoltage at the location in the power system comprises:
   directing a current at the location in the power system to ground.

5. The method of claim 1, wherein identifying the subtransient current at the location in the power system is selected from:
   identifying a current level at the location in the power system that is greater than a current level threshold;
   identifying a change in the current level at the location in the power system that is greater than a change in current level threshold; and
   identifying a rate of the change in the current level at the location in the power system that is greater than a rate of change in current level threshold.

6. The method of claim 1, wherein:
   directing the subtransient current at the location in the power system to ground comprises closing a switch connecting the location in the power system to ground;
   ceasing directing the subtransient current at the location in the power system to ground comprises opening the switch in response to identifying the end of the time delay; and
   suppressing the overvoltage at the location in the power system comprises closing the switch connecting the location in the power system to ground.

7. The method of claim 1, wherein identifying the end of the time delay comprises identifying a current level at the location in the power system that is less than a current level threshold.

8. The method of claim 1 further comprising preventing suppressing the overvoltage at the location in the power system in response to identifying the subtransient current at the location in the power system.

9. An apparatus, comprising:
   a subtransient current detector configured to identify a subtransient current at a location in a power system, wherein the power system is on an aircraft;
   a subtransient current suppressor configured to direct the subtransient current at the location in the power system to ground for a time delay in response to the subtransient current detector identifying the subtransient current at the location in the power system and to cease directing the subtransient current at the location in the power system to ground in response to identifying an end of the time delay;

an overvoltage transient detector configured to identify an overvoltage at the location in the power system; and an overvoltage transient suppressor configured to suppress the overvoltage at the location in the power system, by one or more of creating a short at the location or electrically isolating a portion of the power system, in response to the overvoltage transient detector identifying the overvoltage at the location in the power system.

10. The apparatus of claim 9, wherein the location in the power system comprises a point of control in the power system at which power provided by the power system is controlled.

11. The apparatus of claim 9, wherein the location in the power system comprises generator feeder lines on which power is provided from a generator to the power system.

12. The apparatus of claim 9, wherein the overvoltage transient suppressor is configured to suppress the overvoltage at the location in the power system by directing a current at the location in the power system to ground.

13. The apparatus of claim 9, wherein the subtransient current detector is configured to identify the subtransient current at the location in the power system by identifying one of:
 a current level at the location in the power system that is greater than a current level threshold;
 a change in the current level at the location in the power system that is greater than a change in current level threshold; and
 a rate of change in the current level at the location in the power system that is greater than a rate of change in current level threshold.

14. The apparatus of claim 9, wherein:
 the subtransient current suppressor is configured to direct the subtransient current at the location in the power system to ground by closing a switch to connect the location in the power system to ground and to cease directing the subtransient current at the location in the power system to ground by opening the switch in response to identifying the end of the time delay; and the overvoltage transient suppressor is configured to suppress the overvoltage at the location in the power system by closing the switch to connect the location in the power system to ground.

15. The apparatus of claim 9, wherein the apparatus is configured to identify the end of the time delay by identifying a current level at the location in the power system that is less than a current level threshold.

16. The apparatus of claim 9, wherein the apparatus is configured to prevent the overvoltage transient suppressor suppressing the overvoltage at the location in the power system in response to the subtransient current detector identifying the subtransient current at the location in the power system.

17. A method of suppressing a subtransient current and an overvoltage in a power system, comprising:
 identifying, by a subtransient current detector, the subtransient current at a location in the power system, wherein the power system is on an aircraft;
 using a subtransient current suppressor to perform the steps of:
  closing a switch connecting the location in the power system to ground to direct the subtransient current at the location in the power system to ground for a time delay in response to identifying the subtransient current at the location in the power system;
  opening the switch to cease directing the subtransient current at the location in the power system to ground in response to identifying an end of the time delay;
 identifying, by an overvoltage transient detector, the overvoltage at the location in the power system; and
 closing the switch connecting the location in the power system to ground, using an overvoltage transient suppressor, to create a short or electrically isolate a portion of the power system to suppress the overvoltage at the location in the power system in response to identifying the overvoltage at the location in the power system.

18. The method of claim 17 further comprising:
 preventing suppressing the overvoltage at the location in the power system in response to identifying the subtransient current at the location in the power system; and
 enabling suppressing the overvoltage at the location in the power system in response to identifying the end of the time delay.

* * * * *